United States Patent
Bonoz

(10) Patent No.: US 8,905,079 B2
(45) Date of Patent: Dec. 9, 2014

(54) VENTURI EDUCTOR WITH ADJUSTABLE FLOW RESTRICTOR

(71) Applicant: Brightwell Dispensers Limited, Newhaven, East Sussex (GB)

(72) Inventor: Vincent Etienne Bonoz, Hailsham (GB)

(73) Assignee: Brightwell Dispensers Limited, Newhaven (GB)

( * ) Notice: Subject to any disclaimer, the term of this patent is extended or adjusted under 35 U.S.C. 154(b) by 32 days.

(21) Appl. No.: 13/645,269

(22) Filed: Oct. 4, 2012

(65) Prior Publication Data

US 2013/0112285 A1 May 9, 2013

(30) Foreign Application Priority Data

Oct. 4, 2011 (GB) .................................. 1117194.9

(51) Int. Cl.
| | | |
|---|---|---|
| *B01F 5/04* | (2006.01) | |
| *E03C 1/046* | (2006.01) | |
| *B01F 15/04* | (2006.01) | |
| *F16L 37/14* | (2006.01) | |

(52) U.S. Cl.
CPC ................. *E03C 1/046* (2013.01); *B01F 5/043* (2013.01); *B01F 15/0429* (2013.01); *F16L 37/144* (2013.01)
USPC .............. 137/893; 137/897; 137/556; 251/89

(58) Field of Classification Search
USPC ............ 137/602, 888, 893, 897, 556; 251/89, 251/111
See application file for complete search history.

(56) References Cited

U.S. PATENT DOCUMENTS

| | | | | | |
|---|---|---|---|---|---|
| 2,510,356 | A | * | 6/1950 | Werts | 137/454.2 |
| 3,042,077 | A | * | 7/1962 | Waddington et al. | 137/893 |
| 3,762,439 | A | * | 10/1973 | Heath | 137/549 |
| 4,148,460 | A | * | 4/1979 | Kinsler | 251/206 |
| 5,253,677 | A | * | 10/1993 | Sand | 137/888 |
| 5,518,020 | A | * | 5/1996 | Nowicki et al. | 137/216 |
| 5,522,419 | A | | 6/1996 | Sand | |
| 5,816,446 | A | | 10/1998 | Steindorf et al. | |
| 6,655,401 | B2 | * | 12/2003 | Sand et al. | 137/1 |
| 6,766,831 | B2 | * | 7/2004 | Oliver | 137/893 |
| 6,877,890 | B2 | * | 4/2005 | Whiteley | 366/163.2 |
| 7,331,488 | B2 | * | 2/2008 | Naslund et al. | 222/144 |
| 2011/0139284 | A1 | * | 6/2011 | Dyer | 137/892 |

FOREIGN PATENT DOCUMENTS

| | | |
|---|---|---|
| EP | 0804697 | 12/1995 |
| EP | 1390129 | 11/2002 |
| EP | 1 351 008 A1 | 10/2003 |
| WO | WO 94/04857 | 3/1994 |

\* cited by examiner

*Primary Examiner* — Stephen M Hepperle
*Assistant Examiner* — Umashankar Venkatesan
(74) *Attorney, Agent, or Firm* — Levy & Grandinetti

(57) ABSTRACT

A venturi eductor comprising a flow passage for a first liquid, a dispensing passage with an opening into the flow passage to allow a second liquid to be drawn therethrough and into a first liquid flowing through the flow passage, and a flow restrictor in the dispensing passage, in which the flow restrictor comprises a body with a plurality of nozzles passing therethrough with varying sizes of orifice, which body is movable between a first position in which a first of said nozzles is disposed in the path of the second liquid, and further positions in each of which a further of said nozzles is disposed in the path of the second liquid.

19 Claims, 6 Drawing Sheets

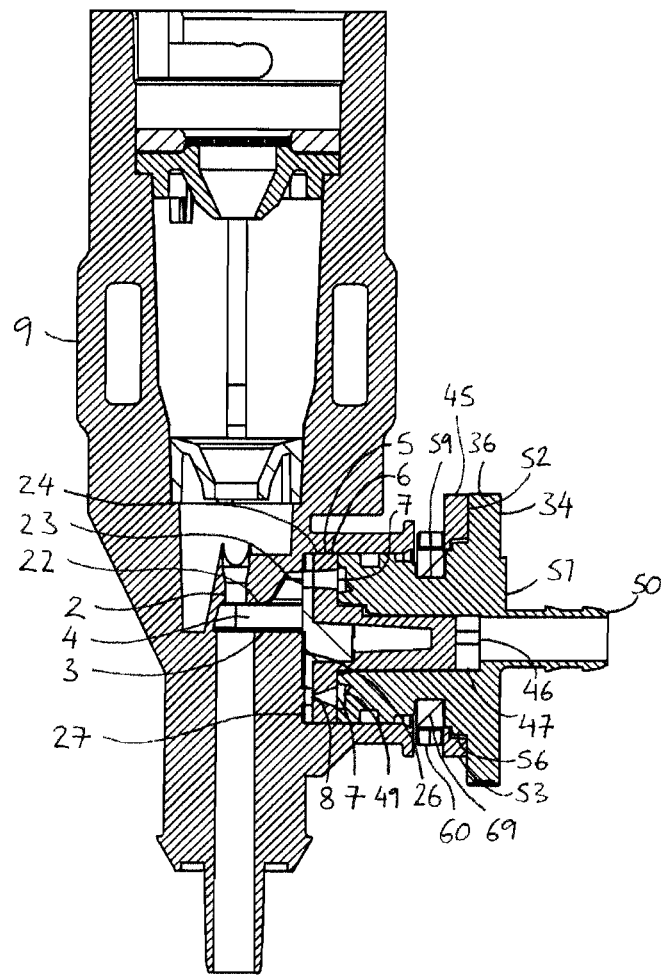

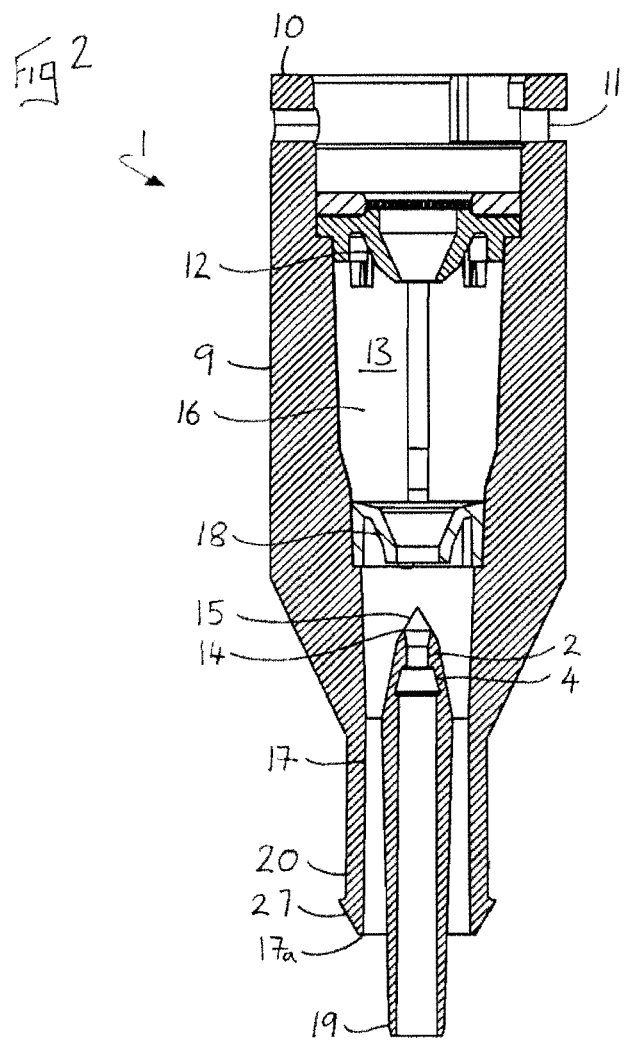

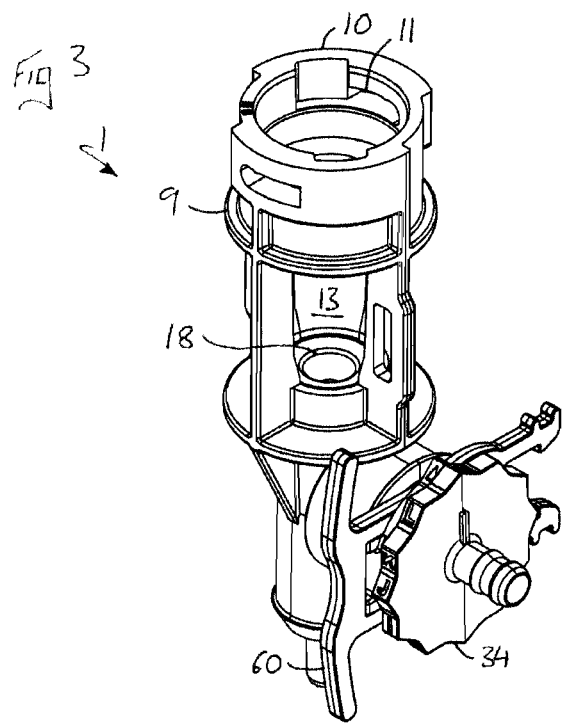
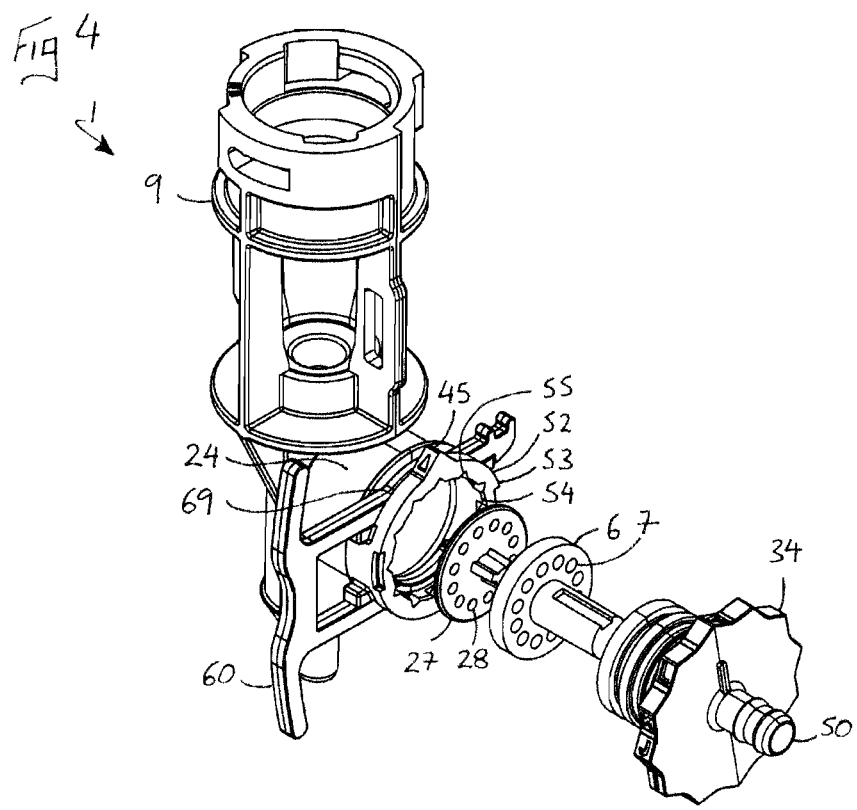

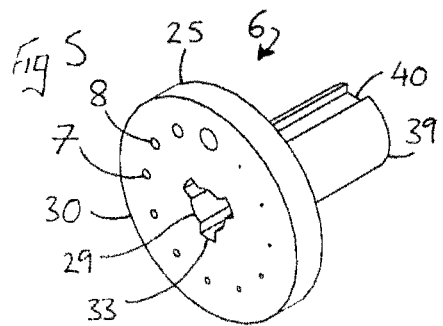
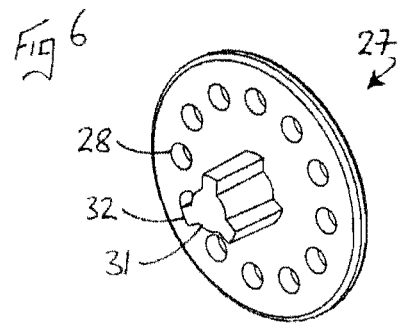
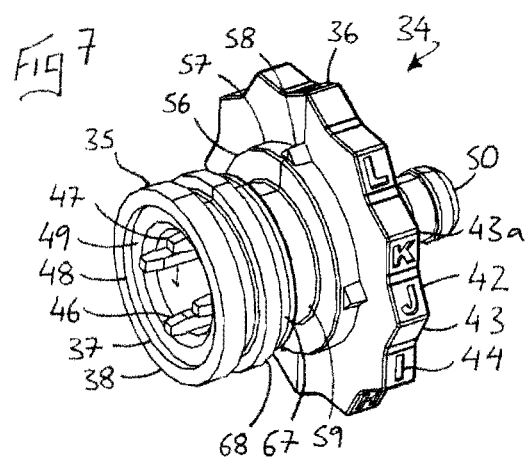
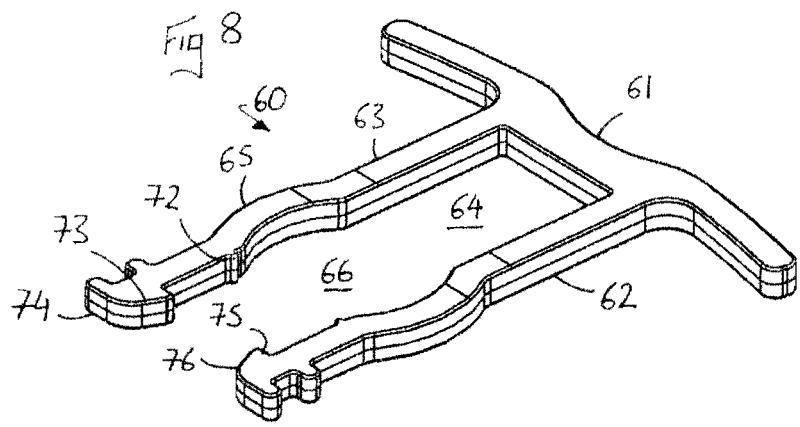

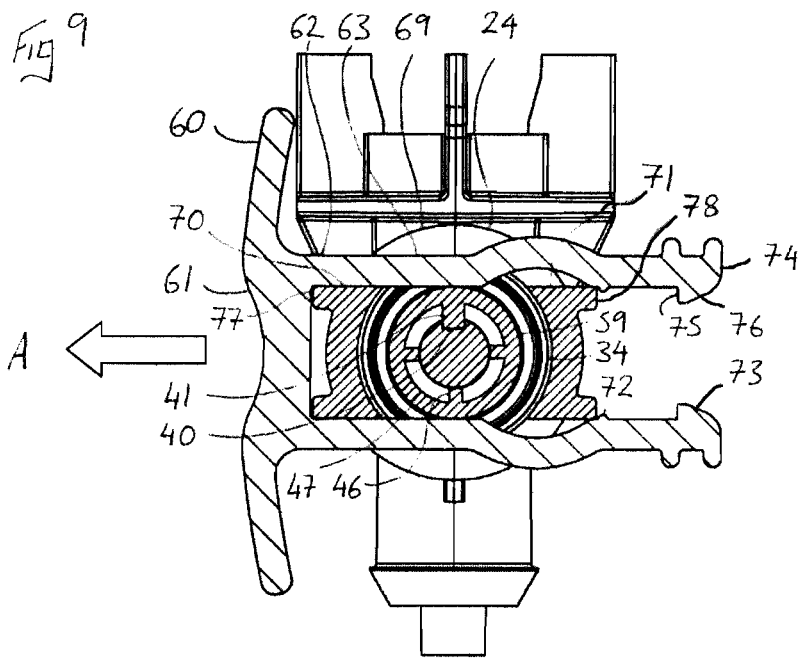
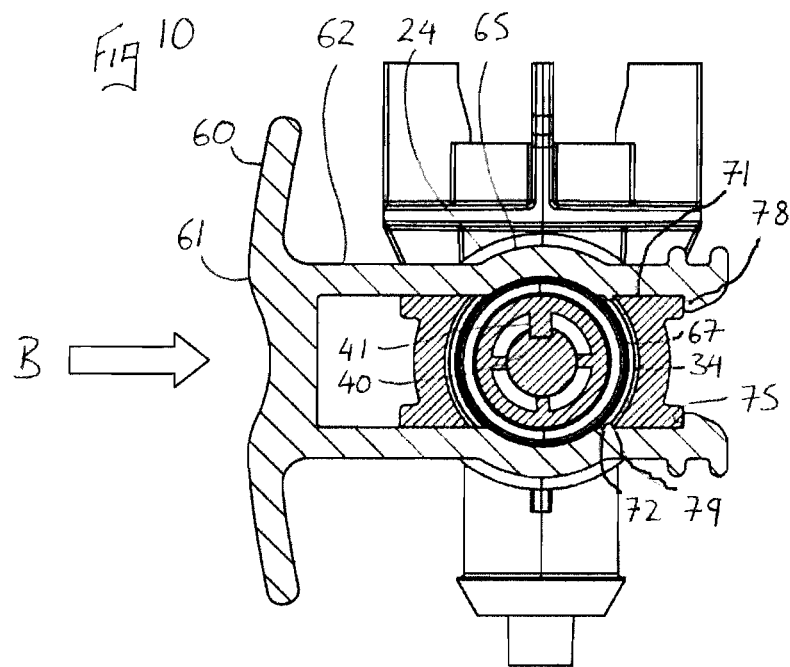

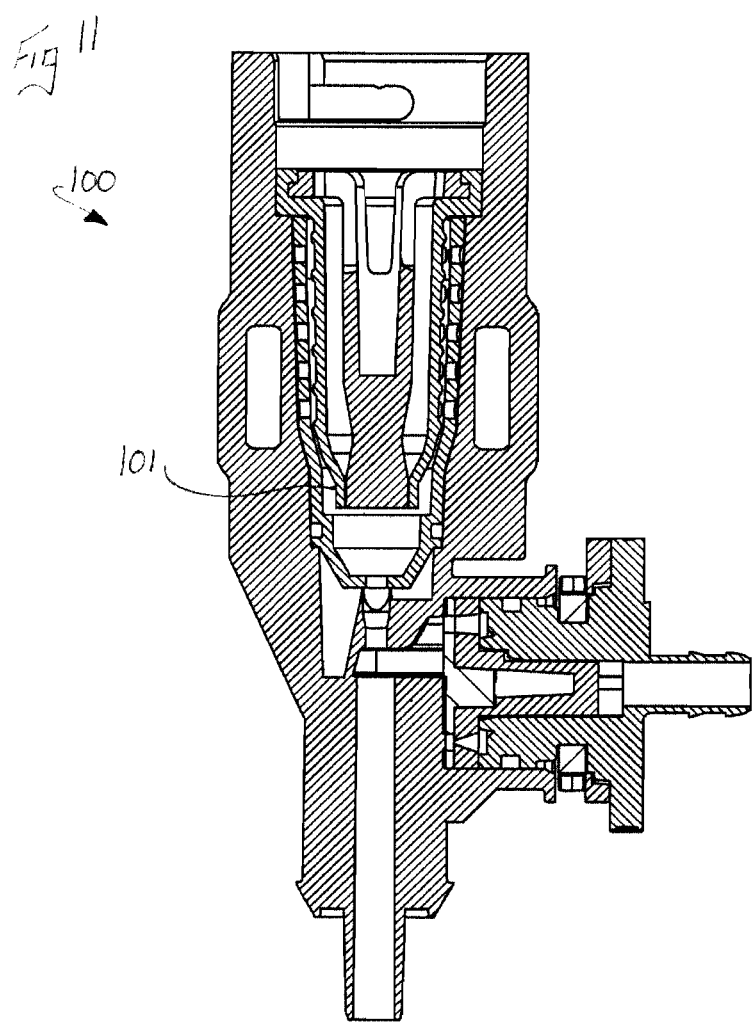

VENTURI EDUCTOR WITH ADJUSTABLE FLOW RESTRICTOR

This Application claims priority to Great Britain Application Number 1117194.9 filed on Oct. 4, 2011.

The present invention relates to a venturi eductor with an adjustable flow restrictor, for use particularly, but not exclusively to mix water with a concentrated chemical cleaning product.

When chemical cleaning products are provided for use on an industrial scale, for example for cleaning hospitals or hotels, or for use in commercial washing machines, they are generally packaged in concentrated form. It is therefore necessary to mix the concentrated product with water to achieve a desired dilution ratio for use, and this is not easily done consistently without the use of an automatic proportioning system.

Therefore, venturi eductors are commonly used to dilute such concentrated chemical cleaning products with water in a consistent and controlled way. These devices work by passing a controlled stream of water through a venturi, which acts to draw the chemical product through an adjoining dispensing passage and into the water stream at a particular rate. The water, which is usually drawn from a mains water supply and then provided at a controlled pressure, travels through a flow passage and entrains the chemical product through an opening at a point where the flow passage widens. The proportion of the chemical product drawn into the flow of water can be precisely controlled to obtain a desired dilution ratio of output. This can be achieved by forming the diameter of the dispensing passage such that the chemical product will pass therethrough at a desired rate. However, this does not allow for the dilution ratio to be adjusted. Therefore, it is also known to control the proportion of the chemical product drawn into the flow of water by placing removable flow restrictors in the dispensing passage. Such flow restrictors comprise a body with a nozzle passing therethrough which has an orifice of a desired size.

However, this arrangement has several disadvantages. Firstly, to change the dilution ratio the eductor must be taken to pieces and the flow restrictor switched out for an alternative. This is not a quick or user-friendly arrangement. In addition, the flow restrictors are small in size, which makes them awkward to handle, and liable to be misplaced when not in use. This is a problem when a flow restrictor is to be changed for an alternative, but is also a problem when a flow restrictor must be removed for cleaning, which can be a common occurrence because they are easily blocked in use by solid particles in the concentrated chemical cleaning product. Furthermore, given the small size of the known flow restrictors, attempts to clean them often result in damage.

In order to overcome some of the problems associated with these flow restrictors, EP1390129 in the name of JohnsonDiversey discloses an alternative arrangement in which the size of the chemical product dispensing passage, and therefore the flow rate, is adjustable. A restrictor plug comprising a plurality of differently sized grooves on its outer surface is disposed in a socket with a chosen groove aligned with a lateral inlet of the chemical product. By changing the rotational position of the restrictor plug so a different groove is aligned with the inlet, the diameter of the resulting dispensing passage is altered to change the dispensing rate.

However, this configuration suffers from a number of drawbacks. Firstly, there is no adequate seal between the restrictor plug and the walls of the socket, which means that the chemical product can leak from the formed dispensing passage, inadvertently increasing the flow rate, and/or allowing the chemical product to leak out from the open end of the socket. A sleeve-like seal around the restrictor plug which might address this issue would not function in conjunction with the axial and/or rotational movement of the restrictor plug required to adjust its position in use.

Secondly, in order to lock the restrictor plug in a particular rotational position it comprises a plurality of indents in an outer surface thereof, which are axially coincident with a tab provided at the outer end of the socket. Therefore, in order to adjust the rotational position of the restrictor plug in the socket it must be axially withdrawn therefrom to disengage an indent from the tab. An undesired result of this configuration is that the restrictor plug can be completely removed from the socket during use, leading to unrestricted flow of the chemical product into the water and/or out of the device. Either way, such an occurrence would result in a dilution ratio which was not correct.

Thirdly, the number of grooves of a useful and practical diameter which be formed in the outer surface of a restrictor plug are limited. In EP1390129 there are only four grooves in the plug, and to overcome this limitation a plurality of interchangeable plugs are provided each with differently sized grooves. It is therefore an actual requirement that the plug is fully removable, so it can be switched out for an alternative. As described above, this can cause problems if a plug is inadvertently removed in use. This arrangement also suffers from the problem that the plugs which are not in use can be misplaced, as is the case with the prior art interchangeable flow restrictors.

The object of the present invention is to overcome some of the above described problems.

Therefore, according to the present invention a venturi eductor comprises a flow passage for a first liquid, a dispensing passage with an opening into the flow passage to allow a second liquid to be drawn therethrough and into a first liquid flowing through the flow passage, and a flow restrictor in the dispensing passage, in which the flow restrictor comprises a body with a plurality of nozzles passing therethrough with varying sizes of orifice, which body is movable between a first position in which a first of said nozzles is disposed in the path of the second liquid, and further positions in each of which a further of said nozzles is disposed in the path of the second liquid.

Thus, the present invention provides a venturi eductor with an adjustable flow restrictor which overcomes the problems associated with the prior art by having a plurality of nozzle orifices which can be selectively aligned to control the flow of the second liquid. Providing an adequate seal between such nozzles is possible, and a larger number of such nozzles can be provided than the number of grooves shown in the prior art restrictor plug.

Preferably the flow restrictor body can be annular, and the plurality of nozzles can be arranged in an annular configuration about an axis of said flow restrictor body. Therefore, rotation of the flow restrictor body about its axis can revolve the configuration of nozzles until the desired nozzle is selected.

The venturi eductor can comprise an eductor body which defines the flow passage for a first liquid and the dispensing passage. The dispensing passage can comprise an inner section leading from an intermediary inlet to said opening into the flow passage, and an outer section. The flow restrictor body can then be disposed in said outer section and can be rotatable therein about said axis between said first position in which said first nozzle is aligned with said intermediary inlet, and said further positions in each of which a further of said nozzles is aligned with said intermediary inlet.

In a preferred construction the outer section can comprise a face on which said intermediary inlet can be formed, and against which said flow restrictor body can be applied. A seal member can then be disposed between the flow restrictor body and the face, which can block any fluid path between said intermediary inlet and said nozzles which are not aligned with said intermediary inlet.

This configuration of a face against which the flow restrictor body can be applied allows for there to be an effective seal member therebetween, because the seal member can be a flat body which can be compressed to provide an adequate seal. Means are provided to hold the flow restrictor body and the seal in position in use, which are described further below.

The seal can be annular, and can comprise a plurality of openings arranged in an annular configuration about an axis of said seal. Each of the openings can be aligned with one of said nozzles of the flow restrictor body, and the axis of said flow restrictor body and the axis of said seal can be aligned. The flow restrictor body and said seal can be connected together by first linkage means such that they are rotatable in unison.

Therefore, the openings in the annular seal allow for each nozzle to be in fluid communication with the intermediary inlet when it is aligned therewith, and the axial alignment and connection between the flow restrictor body and the seal ensure that the openings are always aligned with their corresponding nozzles.

In a preferred construction the flow restrictor body can comprise an axially extending socket at a first end thereof, and the seal can comprise an axially extending projection disposed in said socket. The first linkage means can comprise one or more radially extending arms formed on said projection or in said socket which engage with corresponding one or more radially extending troughs formed in said socket or on said projection accordingly. This provides a simple and effective connection and rotational link between these two parts.

The flow restrictor body can be rotated in use by means of any form of knob, trigger or dial associated therewith. However, preferably the venturi eductor of the invention further comprises a control member comprising a manual rotation surface, and an axis of rotation about which it is rotatable; the axis of said control member and the axis of said flow restrictor body can be aligned; and said control member and said flow restrictor body can be connected together by second linkage means such that manual rotation of the control member can rotate the flow restrictor body in unison. Therefore, the positioning of the flow restrictor body can be controlled via manipulation of the manual rotation surface, which can be any known operating surface such as a lever, handle or dial.

With regard to the manner in which these parts are connected together for mutual rotation, the control member can comprise an axially extending socket at a first end thereof, and said flow restrictor body can comprise an axially extending projection disposed in said socket. The second linkage means can comprise one or more radially extending arms formed on said projection or in said socket which engage with corresponding one or more radially extending troughs formed in said socket or on said projection accordingly. Again, this provides a simple and effective connection and rotational link between these two parts.

The second liquid can enter the dispensing passage and be directed to the flow restrictor body in any way, including through a dedicated inlet adjacent to the location of the flow restrictor body, and either from an axial direction of the dispensing passage, or normal thereto as in the prior art. However, in a preferred construction a first fluid flow area can be defined between the socket of said control member and the projection of said flow restrictor body, and a second fluid flow area can be defined between the first end of said control member and said flow restrictor body. The first fluid flow area and the second fluid flow area can define a fluid path through said outer section of the dispensing passage.

With this construction there is basically formed a sleeve-like fluid passageway down the inside of the control member, which communicates with a ring-like area immediately adjacent to the annular flow restrictor body. As such, all the nozzles of the flow restrictor body are flooded in use, but only that which is aligned with the intermediary inlet functions to restrict the flow of the second liquid. The seal prevents the second liquid from leaking through any of the other nozzles and entering the intermediary inlet. The sleeve-like fluid passageway down the inside of the control member is divided up by the radially extending parts of the second linkage means, but this does not restrict the supply of the second liquid to the intermediary inlet.

A second liquid inlet can be provided at a second end of the control member, which can be in fluid communication with said first fluid flow area. This provides for the second liquid to enter the dispensing passage from its source.

The control member can comprise a cylindrical body at least part of which can be disposed in the outer section of said dispensing passage, and an operation dial which can be disposed outside of said dispensing passage. The manual rotation surface referred to above can comprise an outer rim of said dial.

Preferably the outer rim can comprise a plurality of indicia which can correspond with the plurality of nozzles of said flow restrictor body. The eductor body can comprise a position marker, and axial alignment of one of said plurality of indicia with said position marker can align the corresponding nozzle with said intermediary inlet. This provides a simple and effective mechanism for a user to rotate the flow restrictor body into the correct position to achieve a desired dilution ratio of the first and second liquids.

In one embodiment of the invention the outer section of said dispensing passage can comprise a first part of lock means at outer end thereof, and the control member can comprise a corresponding second part of lock means. When said first and second parts of said lock means are engaged rotation of the control member can be prevented. This feature allows for the flow restrictor body to be locked in position in use, such that the set dilution ratio cannot inadvertently change.

This lock means can be any known mechanism for preventing the rotational movement of one part in relation to another, but in a preferred construction the first part of said lock means can comprise a first ring and the second part of the lock means can comprise a second ring axially coincident with said first ring and radially in contact therewith. The lock means can then comprise one or more radially extending teeth formed on said first ring or said second ring which can engage with corresponding one or more radially extending indents formed in said first ring or said second ring accordingly. This is a simple and effective mechanism for preventing the rotation of the control means.

In order to allow for the lock means to be released, the control member can be axially movable in the outer section of said dispensing passage between a lock position in which the first and second parts of said lock means are engaged, and a rotation position in which the first and second parts of said lock means are disengaged. This axial movement places the seal under no undue pressure as it simply disengages and re-engages with the face. It will therefore be appreciated that by virtue of the shape of the flow restrictor body, the advantageously simple axially disengaged lock means of the prior art can be employed here without preventing the use of an effective seal between the nozzles.

As an enhancement of the above arrangement the control member can comprise the first part of lock release means, and the venturi eductor can further comprise a lock release member comprising the second part of said lock release means. When said first and second parts of said lock release means are engaged, axial movement of the control member can be prevented. Therefore, the lock means which acts to prevent the rotation of the control member can itself be locked in place by the lock release means. This prevents any inadvertent axial movement of the control member in use which could release of the lock means, which might then lead to the accidental rotation of the control member. By axially locking the control member in place, this feature also ensures that the seal is held in position between the control member and the face, such that it functions effectively.

The first part of said lock release means can comprise an annular trough formed in the outer surface of said control member. The lock release member can then comprise a handle with a pair of parallel arms extending from one side thereof, which pair of parallel arms can comprise a first section defining a first gap therebetween and a second section defining a second gap therebetween, said first gap can be slightly larger than the diameter of said annular trough, and said second gap can be slightly larger than the diameter of a section of the outer surface of said control member adjacent to said annular trough. Further, the outer section of the dispensing passage can comprise a laterally extending opening in which the lock release member can be disposed, such that said lock release member can also be laterally mounted to the control member and be movable between an engaged position in which the first section of the parallel arms are disposed in said annular trough and a disengaged position in which the second section of the parallel arms is coincident with the control member.

This construction provides a handle which can be laterally moved in use to retain the control member in its lock position, or to release it for axial movement thereof into its rotation position.

Preferably the outer surface of the control member can comprises a flange which can be axially spaced apart from said annular trough by said section of the outer surface of said control member adjacent to said annular trough, and the diameter of said flange can be greater than the second gap between the arms of the lock release member. This feature prevents the control member from axially moving outward any further once the first and second parts of the lock means have been disengaged. As such, the control member cannot be inadvertently removed and the venturi eductor dismantled, as is possible in the prior art.

In one embodiment of the invention the pair of parallel arms can be resilient and can comprise first and second pairs of inwardly facing abutments, and the outer section of the dispensing passage can comprise support lugs. In said engaged position said first pair of abutments can releasably engage said lugs. This acts to releasably hold the lock release member in the engaged position. In said disengaged position said second pair of abutments can engage said lugs. This prevents the lock release member from laterally moving outward any further once it has reached the disengaged position. As such, the lock release member cannot be inadvertently removed and the venturi eductor dismantled.

The invention can be performed in various ways, but two embodiments will now be described by way of example, and with reference to the accompanying drawings, in which:

FIG. 1 is a cross-sectional side view of a venturi eductor according to the present invention;

FIG. 2 is a cross-sectional rear view of the venturi eductor as shown in FIG. 1;

FIG. 3 is a perspective front view of the venturi eductor as shown in FIG. 1;

FIG. 4 is an exploded perspective front view of the venturi eductor as shown in FIG. 3;

FIG. 5 is a perspective view of a flow restrictor body component of the venturi eductor as shown in FIG. 1;

FIG. 6 is a perspective view of a seal member component of the venturi eductor as shown in FIG. 1;

FIG. 7 is a perspective view of a control member component of the venturi eductor as shown in FIG. 1;

FIG. 8 is a perspective view of a lock release member component of the venturi eductor as shown in FIG. 1;

FIG. 9 is a cross-sectional front view of part of the venturi eductor as shown in FIG. 1 in an engaged position of the lock release member;

FIG. 10 is a cross-sectional front view of part of the venturi eductor as shown in FIG. 1 in a disengaged position of the lock release member; and FIG. 11 is a cross-sectional side view of a second venturi eductor according to the present invention.

As shown in FIGS. 1 to 4, a venturi eductor 1 comprises a flow passage 2 for a first liquid, a dispensing passage 3 with an opening 4 into the flow passage 2 to allow a second liquid to be drawn therethrough and into a first liquid flowing through the flow passage 2, and a flow restrictor 5 in the dispensing passage 3, in which the flow restrictor 5 comprises a body 6 with a plurality of nozzles 7 passing therethrough with varying sizes of orifice 8, which body 6 is movable between a first position, as shown in FIG. 1, in which a first 7' of said nozzles 7 is disposed in the path of the second liquid, and further positions in each of which a further of said nozzles 7 is disposed in the path of the second liquid.

Aside from the construction of the dispensing passage 3, the venturi eductor 1 is of a similar construction to known examples. It comprises an eductor body 9 which defines the flow passage 2 for the first liquid, which in this case will be water, and the dispensing passage 3 for the second liquid, which in this case will be a concentrated chemical cleaning product.

Referring to FIG. 2, the eductor body 9 is adapted to connect at a first end 10 thereof to a mains water supply, by means of a bayonet style fitting 11. The water is passed through a pressure funnel 12 which generates a controlled downward stream, which is directed through an air gap 13 to a venturi inlet 14 with tapered sides 15. The air gap 13 serves to prevent any of the concentrated chemical cleaning product drawn through the dispensing passage 3 in use from ever entering the mains water supply. Any such inadvertent backflow would enter the air gap 13, and escape from the eductor body 9 through apertures 16.

Some of the water stream directed to the venturi inlet 14 does not pass through it, and instead impacts the tapered sides 15 around the inlet 14. By virtue of the tapered angle of the sides 15 most of this water is directed down a diversion passage 17, to later co-mingle with the mixed product. However, some back spray is also inevitable, and in order to prevent this from travelling back up and into the air gap 13, a funnel-shaped spray-back protector 18 is positioned above the venturi inlet 14. Any spray which impacts the spray-back protector 18 gathers and drops down the diversion passage 17, to later co-mingle with the mixed product.

The water which passes through the venturi inlet 14 enters the flow passage 2, which is initially narrow prior to the opening 4, then wider. As such, the water pressure is initially low, and then it increase at the point of the opening 4. This increase in pressure acts to draw the concentrated chemical cleaning product through the opening 4 and into the passing water stream. The mixture then passes down the flow passage 2 to an outlet 19.

The second end 20 of the eductor body 9 connects to a hose (not shown) by means of a barb fitting 21. The outlets 19 and 17a of the flow passage 2 and the diversion passage 17 respectively are displaced from one another, but both are below the level of the connection to a hose.

As discussed above, the proportion of the concentrated chemical cleaning product which is drawn into the flow of water must be precisely controlled in order to obtain a mixed product with the desired dilution ratio. This is achieved by controlling the diameter of the dispensing passage 3 such that the concentrated chemical cleaning product passes therethrough at a desired rate. In the prior art the dispensing passage is merely a straight passageway, perhaps with a simple flow restrictor placed therein. However, in venturi eductor 1 the dispensing passage 3 contains a number of interconnecting moving parts which work together to allow for the flow of the concentrated chemical cleaning product to be adjusted to suit.

Referring back to FIG. 1, the dispensing passage 3 comprises an inner section 22 leading from an intermediary inlet 23 to said opening 4 into the flow passage 2, and an outer section 24, which is in the form of an annular socket with a much larger diameter than the inner section 22.

Contained within the outer section 24 is the flow restrictor body 6. Referring to FIG. 5, which illustrates this component in isolation, it comprises an annular head 25, which defines the plurality of nozzles 7 in an annular configuration about a central axis. The head 25 is substantially the same diameter as the outer section 24 of the dispensing passage 2, so it fits snugly inside. It is housed therein with its axis aligned with that of the outer section 24 (see FIG. 4). In this position the flow restrictor body 6 can be rotated on its axis to align one of the nozzles 7 with the intermediary inlet 23 as desired.

The outer section 24 comprises a face 26 on which said intermediary inlet 23 is formed, and against which the flow restrictor body 6 is applied. The face 26 is the inner end of the socket formed by the outer section 24. A seal member 27 is disposed between the flow restrictor body 6 and the face 26, which blocks any fluid path between the intermediary inlet 23 and all the nozzles 7 which are not aligned with the intermediary inlet 23 in use.

Referring to FIG. 6, which illustrates this component in isolation, the seal member 27 is annular, and comprises a plurality of openings 28 arranged in an annular configuration about a central axis. The seal member 27 is substantially the same diameter as the outer section 24 of the dispensing passage 2, so it fits snugly inside. When the seal member 27 is in position between the flow restrictor body 6 and the face 26, each of the openings 28 is aligned with one of the nozzles 7 of the flow restrictor body 6 (see FIGS. 1 and 4). As such, a fluid path is provided between the intermediary inlet 23 and the nozzle 7 aligned therewith in use.

It will be appreciated that with this configuration of a flat face 26 against which the flow restrictor body 6 can be applied, the seal member 27 can be effective because it comprises a flat body which can be compressed to provide an adequate seal.

The flow restrictor body 6 and the seal member 27 are connected together so they are rotatable in unison. Referring to FIGS. 5 and 6 (in which the flow restrictor body 6 and the seal member 27 are shown from opposite viewpoints), the flow restrictor body 6 comprises an axially extending socket 29 at a first end 30 thereof, and the seal member 27 comprises an axially extending projection 31 adapted to be disposed in said socket 29 (as illustrated in FIG. 1). The projection 31 comprises three radially extending arms 32, which engage with three corresponding radially extending troughs 33 formed in said socket 29. This radially extending interconnection between these two components ensures that they rotate in unison in use. Further, it also ensures that the two components are correctly rotationally aligned with one another, with the openings 28 overlying the nozzles 7 (as illustrated in FIG. 1).

To provide for the manual rotation of the flow restrictor body 6, the venturi eductor 1 further comprises control member 34. Referring to FIG. 7, which illustrates this component in isolation, the control member 34 comprises a cylindrical body 35 with an operation dial 36 at one end thereof. As shown in FIG. 1, the control member 34 is disposed in the socket formed by the outer section 24 of the dispensing passage 3, with the operation dial 36 disposed outside the outer section 24, where it can be readily accessed. The cylindrical body 35 of the control member 34 is substantially the same diameter as the outer section 24 of the dispensing passage 2, so it fits snugly inside. The central axis of the control member 34 is aligned with that of the outer section 24, as well as with the central axes of the flow restrictor body 6 and the seal member 27, as is illustrated by FIGS. 1 and 4.

The control member 34 and the flow restrictor body 6 are connected together so they are rotatable in unison. Referring to FIGS. 5 and 7 (in which the flow restrictor body 6 and the control member 34 shown from similar viewpoints), the control member 34 comprises an axially extending socket 37 at a first end 38 thereof, and the flow restrictor body 6 comprises an axially extending projection 39 adapted to be disposed in said socket 37 (as illustrated in FIG. 1). The projection 39 comprise a radially extending trough 40, which engages with a corresponding radially extending arm 41 formed in said socket 37. (The arm 41 is not visible in any of FIGS. 1 to 7, but it can be seen in the cross-sectional views of FIGS. 9 and 10.) This radially extending interconnection between these two components ensures that they rotate in unison in use.

Further, this radial interconnection also ensures that the control member 34 and the flow restrictor body 6 are correctly rotationally aligned with one another. The outer rim 42 of the operation dial 36 carries indicia, in the form of angular undulations 43 with letters 44 on them. These indicia 43 and 44 correspond with the nozzles 7 of the flow restrictor body 6, and indicate to the user which nozzle 7 is aligned with the intermediary inlet 23. Accordingly, the eductor body 9 comprises a triangular position marker 45 (see FIG. 4), and axial alignment of the peak 43a of one of the undulations 43 of the operation dial 36 with the position marker 45 aligns the nozzle 7 corresponding to the letter 44 of the undulation 43 with the intermediary inlet 23.

The physical connection between the control member 34 and the flow restrictor body 6 is limited, such that an open area is provided between them, which forms the fluid path through the outer section 24 of the dispensing passage 3. In particular, the projection 39 of the flow restrictor body 6 has a smaller diameter than the socket 37 of the control member 34, and is held in position therein by four spacer arms 46 provided in the socket 37, one of which carries the radially extending arm 41. As such a first fluid flow area 47 is formed between these parts, which is best seen in FIGS. 9 and 10. Further, the socket 37 comprises an outer section 48 of greater diameter than the remainder. This outer section 48 has a diameter greater than that of the annular configuration of nozzles 7. Therefore, a second fluid flow area 49 is defined between the first end 38 of the control member 34 and the head 25 of the flow restrictor body 6. The spacer arms 46 extend through the outer section 48 of the socket 37, such that they contact the head of 25 the flow restrictor body 6.

With this construction there is basically formed a sleeve-like fluid passageway down the inside of the control member 34, which communicates with a ring-like area immediately adjacent to the flow restrictor body 6. As such, all the nozzles 7 of the flow restrictor body 6 are flooded in use, but only that which is aligned with the intermediary inlet 23 functions to restrict the flow of the concentrated chemical cleaning product. The seal member 27 prevents the product from leaking through any of the other nozzles 7 and entering the intermediary inlet 23. The first and second fluid flow areas 47 and 49 are divided up by the spacer arms 46, but this does not materially restrict the supply of the product to the intermediary inlet 23.

A fluid inlet 50 is provided at a second end 51 of the control member 34, and as is clear from FIG. 1 this is in fluid communication with the first fluid flow area 47. A hose (not shown) is attached to the inlet 50 in use, through which the concentrated chemical cleaning product is provided.

Referring to FIG. 4, the outer end 52 of the outer section 24 comprises a ring section 53, the inside surface 54 of which comprises 12 equally spaced and outwardly radially extending indents 55. Referring to FIG. 7, the control member 34 comprises a corresponding ring section 56 immediately axially adjacent to the operation dial 36, the outer surface 57 of which comprises 4 equally spaced and outwardly radially extending teeth 58. These ring sections 53 and 56 comprise the first and second parts of a lock means adapted to prevent rotation of the control member 34.

As shown in FIG. 1, when the control member 34 is located in the outer section 24 with the operation dial 36 abutting the outer end 52 of the outer section 24, the ring section 56 of the control member 34 is axially coincident with the ring section 53 of the outer section 24. The ring section 56 is disposed inside the ring section 53. In this position the four teeth 58 of the ring section 56 are disposed in corresponding indents 55 of the ring section 53, thereby preventing any rotation of the control member 34 in relation to the outer section 24.

It will be appreciated that the teeth 58 are positioned such that they axially align with indents 55 of the ring section 53 at rotational positions of the control member 34 in which the peak 43a of one of the undulations 43 of the operation dial 36 align with the position marker 45. As such, the ring sections 53 and 56 can only be axially engaged when a nozzle 7 of the flow restrictor body 6 is aligned with the intermediary inlet 23. The 12 indents 55 correspond to the 12 peaks 43a of the undulations 43 of the operation dial 36, and it will be appreciated that whenever a peak 43a of an undulation 43 aligns with the position marker 45 the four teeth 58 will slot into four of the indents 55.

In order to allow for the ring sections 53 and 56 to be released from one another, the control member 34 is axially movable in the outer section 24 between a lock position as shown in FIG. 1 in which the ring sections 53 and 56 are axially coincident, and a rotation position (not shown) in which the control member 34 has been axially withdrawn from the outer section 24 to such an extent that the ring sections 53 and 56 are no longer coincident. In this position the control member 34 can be axially rotated by manual manipulation of the operation dial 36, to align a desired nozzle 7 with the intermediary inlet 23. It will be appreciated that this axial displacement and rotational movement places the seal member 27 under no undue pressure as it simply disengages and re-engages with the face 26 and rotates within the space inside the outer section 24.

In order to prevent the control member 34 from moving from the lock position to the release position inadvertently, a lock release mechanism is provided. The first part of this lock release means comprises annular trough 59 formed in the control member 34, and the second part comprises lock release member 60. Referring to FIG. 8, which illustrates this component in isolation, it comprises a handle 61 with a pair of resilient parallel arms 62 extending from one side thereof. The arms 62 comprise a first section 63 defining a first gap 64 therebetween, and a second section 65 defining a second gap 66 therebetween. As is clear from FIG. 8, the first gap 64 is linear, while the second gap 66 is annular. The width of the first gap 64 is slightly larger than the diameter of the annular trough 59 of the control member 34, such that the first section 63 of the arms 62 fits snugly therewith, while the annular shape of the second gap 66 is slightly larger than the annular shape of a section 67 of the control member 34 adjacent to said annular trough 59, such that this section 67 can move freely therethrough.

The control member 34 further comprises a flange 68 which is axially spaced apart from the annular trough 59 by the section 67. The diameter of the flange 68 is greater than that of the second gap 66, and as such the control member 34 is prevented from withdrawing from the outer section 24 further than a position in which the flange 68 contacts the arms 62 of the lock release member 60. This prevents the venturi eductor 1 from being inadvertently dismantled in use. The axial length of the section 67 is slightly greater than the axial length of the ring section 56, so the ring section 56 can be fully removed from the ring section 53 to allow for rotation of the control member 34, before further axial displacement of the control member 34 is prevented.

To allow the control member 34 and the lock release member 60 to interact, the outer section 24 on the eductor body 9 comprises a laterally extending opening 69 in which the lock release member 60 is disposed for interaction with the control member 34 inside the outer section 24. Referring to FIGS. 9 and 10, which illustrate a cross-sectional view passing through the opening 69, it can be seen how the lock release member 60 is laterally mounted to the control member 34. It is moveable between an engaged position as shown in FIG. 9, in which the first section 63 of the arms 62 is disposed in the annular trough 59, and a disengaged position as shown in FIG. 10, in which the second section 65 of the arms 62 is coincident with the control member 34, and allows for section of which to move therethrough.

As shown in FIGS. 9 and 10, the outer section 24 comprises support lugs 70 and 71 at opposite sides thereof, which carry the lock release member 60, and define the scope of its lateral movement. The arms 62 of the lock release member 60 comprise a first pair of inwardly facing abutments 72 adjacent to the second section 65 of the arms 62, and a second pair of inwardly facing abutments 73 adjacent to ends 74 of the arms 62. The first pair of abutments 72 have a generally rounded shape, while the second pair of abutments 73 have a flat face 75 on one side, and a rounded face 76 on the opposite side. The first pair of abutments 72 are spaced from the handle 61 by a distance which is slightly longer than the distance between the ends 77 and 78 of the lugs 70 and 71 respectively, while the flat faces 75 of the second pair of abutments 73 are spaced from a centre of the annular gap 66 by a distance which is substantially the same as that between the end 78 of lug 71 and the centre of the outer section 24.

In the engaged position as shown in FIG. 9 the handle 61 abuts against the end 77 of lug 70, and the first pair of abutments 72 overlie the end 78 of the lug 71. As such, the lock release member 60 is held in the engaged position and cannot move freely in either direction. However, when a lateral force in the direction of arrow A is applied to the handle 61, the first pair of abutments 72 are forced against the end 78 of lug 71, and their rounded shape transmits the lateral force into outward flexure of the arms 62. As such, when sufficient force in the direction of arrow A is applied, the first pair of abutments 72 ride over the end 78 of the lug 71, and the lock release member 60 can be moved laterally into the disengaged position as shown in FIG. 10.

In the disengaged position the flat faces 75 of the second pair of abutments 73 abut against the end 78 of lug 71, and the first pair of abutments 72 overlie an inner end 79 of lug 71. As such, the lock release member 60 is held in the disengaged position and cannot move freely in either direction. However, when a reverse lateral force in the direction of arrow B is applied to the handle 61, the first pair of abutments 72 are forced against the inner end 79 of lug 71, and their rounded shape transmits the reverse lateral force into outward flexure of the arms 62. As such, when sufficient reverse lateral force in the direction of arrow B is applied, the first pair of abutments 72 ride over the inner end 79 of the lug 71, and the lock release member 60 can be moved laterally into the engaged position as shown in FIG. 9.

The flat faces 75 of the second pair of abutments 73 are normal to the reverse lateral force in the direction of arrow B, and therefore simply serve to arrest further movement without any transmittal of that force into outward flexure of the arms 62. As a result the lock release member 60 is prevented from being removed from the venturi eductor 1 inadvertently in use.

It will be appreciated from FIG. 10 that in the engaged position the gap 66 of the lock release member 60 is correctly aligned to allow the section 67 of the control member 34 to pass therethrough.

The rounded faces 76 of the second pair of abutments 73 allow for the lock release member 60 to be mounted on the lugs 70 and 71 during construction. The rounded faces 76 are aligned with the end 77 of the lug 70, and a lateral force in the direction of arrow B is applied. The rounded shape of the faces 75 transmits the lateral force into outward flexure of the arms 62, and as such the second pair of abutments 73 ride over the end 77 of the lug 70, and the lock release member 60 can be moved laterally until the faces 75 are aligned with the inner end 79 of lug 71. The lateral force in the direction of arrow B is again applied and the rounded shape of the faces 75 transmits the lateral force into outward flexure of the arms 62, and the second pair of abutments 73 ride over the inner end 79 of the lug 71, and the lock release member 60 can be moved laterally into the disengaged position. It can then be moved into the engaged position, as described above.

The venturi eductor 1 is used as follows. The eductor body 9 is fixed to a mains water supply by means of the bayonet fitting 11. A hose from a supply of the concentrated chemical cleaning product is fixed to the fluid inlet 50. A further hose is fixed to the second end 20 of the eductor body 9 by means of a barb fitting 21.

To set the dilution ratio to that required, the handle 61 is first pulled laterally in the direction of arrow A as shown in FIG. 9 and as described above, until the lock release member 60 is in the disengaged position as shown in FIG. 10. The operation dial 36 is then pulled out, which axially outwardly displaces the control member 34 from the outer section 24 by moving the section 67 of the control member 34 through the second gap 66 of the lock release member 60. This movement continues until the flange 68 engages the arms 62 of the lock release member 60, which occurs after the ring section 56 of the control member 34 is free of the ring section 53 of the outer section 24.

The operation dial 36 is then rotated until the peak 43a of the undulation 43 carrying the letter 44 corresponding to the desired dilution ratio is uppermost, and aligned with the position marker 45. Rotation of the operation dial 36 rotates the control member 34 on its axis, which in turn rotates the flow restrictor body 6 and the seal member 27 on their axes inside the outer section 24, by virtue of the radial interconnection between these three parts. Alignment of the peak 43a of an undulation 43 with the position marker 45 aligns the nozzle 7 with the desired size of orifice 8 with the intermediary inlet 23 by virtue of the fixed rotational positioning between the control member 34 and the flow restrictor body 6.

The operation dial 36 is then pushed back in, axially inwardly displacing the control member 34 into the outer section 24. This movement is continued until the operation dial 36 abuts against the outer end 52 of the outer section 24, with the ring section 56 of the control member 34 axially coincident with the ring section 53 of the outer section 24. In this position the four teeth 58 of the ring section 56 are disposed in corresponding indents 55 of the ring section 53, thereby preventing any rotation of the control member 34 in relation to the outer section 24. In addition, in this position the seal member 27 is compressed between the head 25 of the flow restrictor body 6 and the face 26 of the outer section 24 of the dispensing passage 3, thereby blocking any fluid path between the intermediary inlet 23 and the nozzles 7 which are not aligned therewith.

The handle 61 is then pushed laterally in the direction of arrow B as shown in FIG. 10 and as described above, until the lock release member 60 is in the engaged position as shown in FIG. 9. The first section 63 of the arms 62 is disposed in the annular trough 59, preventing axial displacement of the control member 34. Not only does this prevent the control member 34 from moving outwards in use to such an extent that it may by rotated, but it also ensures that the seal member 27 is held in place against the face 26, effectively preventing any leakage into the intermediary inlet 23.

The mains water supply is then provided to the venturi eductor 1, and is passed through the pressure funnel 12 to generate the controlled downward stream through the air gap 13 to the venturi inlet 14. Any water not entering the venturi inlet 14 passes down the diversion passage 17, to later co-mingle with the mixed product. The water which passes through the venturi inlet 14 enters the flow passage 2, and where it passes the opening 4 the increase in pressure acts to draw the concentrated chemical cleaning product therethrough and into the stream. The mixture then passes down the flow passage 2 to the outlet 19, and into the hose attached to the second end 20 of the eductor body 9. The mixture is directed to its place of use, which could be washing machinery, or a container to be filled with cleaning fluid for manual use.

The concentrated chemical cleaning product is drawn through the inlet 50, down the sleeve-like first fluid flow area 47 and into the ring-like second fluid flow area 49. The product floods these areas and therefore also all the nozzles 7 of the flow restrictor body 6. However, the product only passes through the nozzle which has been aligned with the intermediary inlet 23, which functions to restrict the flow to achieve the desired dilution ratio of output. The seal member 27 prevents the product from leaking through any of the other nozzles 7 and entering the intermediary inlet 23.

In use the venturi eductor 1 only functions correctly if the dispensing passage 3, and the flow passage 2 downstream of the opening 4 are flooded with liquid. Various measures can be applied to ensure that this is the case, and these are known.

In the event that the dilution ratio of the produced mixture needs to be changed, for example if a stronger or weaker cleaning product is required, this can be achieved by adjusting the flow restrictor body 6 to allow a greater or smaller amount of the concentrated chemical cleaning product to be drawn through the dispensing passage 3. The mains water supply is switched off, and the same procedure as described above is carried out to set the dilution ratio to that required. The handle 61 is pulled laterally to place the lock release member 60 in the disengaged position, the operation dial 36 is then pulled out to move the ring section 56 out of the ring section 53, and then the operation dial 36 is rotated until the peak 43a of the undulation 43 carrying the letter 44 corresponding to the desired dilution ratio is uppermost, and aligned with the position marker 45. This aligns the nozzle 7 with the chosen size of orifice 8 with the intermediary inlet 23. The operation dial 36 is then pushed back in, moving the ring section 56 into the ring section 53, and the handle 61 is then pushed laterally to place the lock release member 60 in the engaged position. The mains water supply can then be switched back on, and a product with an altered dilution ratio will be produced.

The embodiment described above can be altered without departing from the scope of claim 1. For example, in one alternative embodiment shown in FIG. 11, a venturi eductor 100 is provided which has the same dispensing passage arrangement as venturi eductor 1 described above, but it features a non-return valve 101 instead of an air gap. Such non-return valves are required in place of air-gaps in certain jurisdictions. The features of non-return valve 101 are generally known, so they are not further described here.

In another alternative embodiment (not shown) the inlet for the second liquid is normal to the axis of the control member as opposed to being co-axial therewith. This allows for a feed hose to be attached from above or below rather than from in front.

In another alternative embodiment (not shown) the projection of the flow restrictor body is provided with a radially outwardly extending arm which engages with a radially outwardly extending trough formed in the socket of the control member. In another alternative embodiment (not shown) the projection of the seal member is provided with a radially inwardly extending trough which engages with a radially inwardly extending arm in the socket of the flow restriction body.

In other alternative embodiments (not shown) other numbers of nozzles are provided on the flow restrictor body, for example 10, 8, 14 or 16.

Therefore, the present invention provides a venturi eductor with an adjustable flow restrictor which overcomes the problems associated with the prior art by having a plurality of nozzle orifices which can be selectively aligned to control the flow of the second liquid which is drawn into the first liquid. The number of such nozzles provided on the flow restrictor body is higher than is possible with the prior art restrictor plug, and is sufficient to avoid the need for a plurality of interchangeable restrictor units. This is also achieved with an effective seal to prevent any leakage from nozzles which are not in use, which is a significant improvement over the grooves shown in the prior art restrictor plug. Further, the present invention also provides an adjustment system with features which prevented it from coming apart in use.

The invention claimed is:

1. A venturi eductor comprising a flow passage for a first liquid, a dispensing passage with an opening into the flow passage to allow a second liquid to be drawn therethrough and into a first liquid flowing through the flow passage, and a flow restrictor in the dispensing passage, in which the dispensing passage comprises an outer section and an inner section leading from an intermediary inlet to said opening into the flow passage, in which said outer section comprises a face on which said intermediary inlet is formed, and against which said flow restrictor is applied, in which the flow restrictor comprises a body with a plurality of nozzles passing therethrough with varying sizes of orifice, which body is movable between a first position in which a first of said nozzles is aligned with said intermediary inlet, and further positions in each of which a further of said nozzles is aligned with said intermediary inlet, in which a seal member is disposed between said flow restrictor and said face, in which said seal member comprises a plurality of openings, each of which is aligned with one of said nozzles of the flow restrictor, and in which said flow restrictor and said seal member are connected together such that they are movable in unison.

2. A venturi eductor as claimed in claim 1 in which the flow restrictor body is annular, and in which the plurality of nozzles are arranged in an annular configuration about an axis of said flow restrictor body.

3. A venturi eductor as claimed in claim 2 in which the venturi eductor comprises an eductor body which defines the flow passage for a first liquid and the dispensing passage in which the flow restrictor body is disposed in said outer section and is rotatable therein about said axis between said first position and said further positions.

4. A venturi eductor as claimed in claim 3 in which said seal member is annular, in which said plurality of openings are arranged in an annular configuration about an axis of said seal member, in which the axis of said flow restrictor body and the axis of said seal member are aligned, and in which said flow restrictor body and said seal member are connected together by first linkage means such that they are rotatable in unison.

5. A venturi eductor as claimed in claim 4 in which said flow restrictor body comprises an axially extending socket at a first end thereof, in which said seal member comprises an axially extending projection disposed in said socket, and in which said first linkage means comprises one or more radially extending arms formed on said projection or in said socket which engage with corresponding one or more radially extending troughs formed in said socket or on said projection accordingly.

6. A venturi eductor as claimed in claim 3 further comprising a control member comprising a manual rotation surface, and an axis of rotation about which it is rotatable, in which the axis of said control member and the axis of said flow restrictor body are aligned, and in which said control member and said flow restrictor body are connected together by second linkage means such that manual rotation of the control member rotates the flow restrictor body in unison.

7. A venturi eductor as claimed in claim 6 in which said control member comprises an axially extending socket at a first end thereof, in which said flow restrictor body comprises an axially extending projection disposed in said socket, and in which said second linkage means comprises one or more radially extending arms formed on said projection or in said socket which engage with corresponding one or more radially extending troughs formed in said socket or on said projection accordingly.

8. A venturi eductor as claimed in claim 7 in which a first fluid flow area is defined between the socket of said control member and the projection of said flow restrictor body, in which a second fluid flow area is defined between the first end of said control member and said flow restrictor body, and in which the first fluid flow area and the second fluid flow area define a fluid path through said outer section of the dispensing passage.

9. A venturi eductor as claimed in claim 8 in which a second liquid inlet is provided at a second end of the control member, which is in fluid communication with said first fluid flow area.

10. A venturi eductor as claimed in claim 6 in which said control member comprises a cylindrical body at least part of which is disposed in the outer section of said dispensing passage, and an operation dial disposed outside of said dispensing passage, and in which said manual rotation surface comprises an outer rim of said dial.

11. A venturi eductor as claimed in claim 10 in which said outer rim comprises a plurality of indicia which correspond with the plurality of nozzles of said flow restrictor body, in which the eductor body comprises a position marker, and in which axial alignment of one of said plurality of indicia with said position marker aligns the corresponding nozzle with said intermediary inlet.

12. A venturi eductor as claimed in claim 11 in which the outer section of said dispensing passage comprises a first part of lock means at outer end thereof, in which the control member comprises a corresponding second part of lock means, and in which when said first and second parts of said lock means are engaged rotation of the control member is prevented.

13. A venturi eductor as claimed in claim 12 in which the first part of said lock means comprises a first ring, in which the second part of the lock means comprises a second ring axially coincident with said first ring and radially in contact therewith, in which said lock means comprises one or more radially extending teeth formed on said first ring or said second ring which engage with corresponding one or more radially extending indents formed in said first ring or said second ring accordingly.

14. A venturi eductor as claimed in claim 13 in which the control member is axially movable in the outer section of said dispensing passage between a lock position in which the first and second parts of said lock means are engaged, and a rotation position in which the first and second parts of said lock means are disengaged.

15. A venturi eductor as claimed in claim 14 in which the control member comprises the first part of lock release means, in which the venturi eductor further comprises a lock release member comprising the second part of said lock release means, and in which when said first and second parts of said lock release means are engaged, axial movement of the control member is prevented.

16. A venturi eductor as claimed in claim 15 in which the first part of said lock release means comprises an annular trough formed in the outer surface of said control member, in which the lock release member comprises a handle with a pair of parallel arms extending from one side thereof, in which said pair of parallel arms comprise a first section defining a first gap therebetween and a second section defining a second gap therebetween, in which said first gap is slightly larger than the diameter of said annular trough, in which said second gap is slightly larger than the diameter of a section of the outer surface of said control member adjacent to said annular trough, in which the outer section of the dispensing passage comprises a laterally extending opening in which the lock release member is disposed, in which said lock release member is laterally mounted to the control member and is movable between an engaged position in which the first section of the parallel arms are disposed in said annular trough and a disengaged position in which the second section of the parallel arms is coincident with the control member.

17. A venturi eductor as claimed in claim 16 in which the outer surface of the control member comprises a flange which is axially spaced apart from said annular trough by said section of the outer surface of said control member adjacent to said annular trough, and in which the diameter of said flange is greater than the second gap between the arms of the lock release member.

18. A venturi eductor as claimed in claim 17 in which said pair of parallel arms are resilient and comprise first and second pairs of inwardly facing abutments, and in which the outer section of the dispensing passage comprises support lugs, in which in said engaged position said first pair of abutments releasably engages said lugs, and in which in said disengaged position said second pair of abutments engages said lugs.

19. A venturi eductor as claimed in claim 5 further comprising a control member comprising a manual rotation surface, and an axis of rotation about which it is rotatable, in which the axis of said control member and the axis of said flow restrictor body are aligned, and in which said control member and said flow restrictor body are connected together by second linkage means such that manual rotation of the control member rotates the flow restrictor body in unison.

* * * * *

UNITED STATES PATENT AND TRADEMARK OFFICE
CERTIFICATE OF CORRECTION

Page 1 of 1

PATENT NO. : 8,905,079 B2
APPLICATION NO. : 13/645269
DATED : December 9, 2014
INVENTOR(S) : Vincent Etienne Bunoz It is certified that error appears in the above-identified patent and that said Letters Patent is hereby corrected as shown below:

ON THE TITLE PAGE

Please correct item (72) Inventor as follows:

(72)   Inventor: Vincent Etienne [[Bonoz]] Bunoz, Hailsham (GB)

Signed and Sealed this
Eighteenth Day of August, 2015

Michelle K. Lee
*Director of the United States Patent and Trademark Office*